United States Patent Office 2,759,000
Patented Aug. 14, 1956

---

2,759,000

CERTAIN SUBSTITUTED PYRIDINDOLES

Charles Ferdinand Huebner, Chatham, N. J., assignor to Ciba Pharmaceutical Products, Inc., Summit, N. J., a corporation of New Jersey No Drawing. Application November 12, 1954,
Serial No. 468,553

3 Claims. (Cl. 260—296)

---

This invention relates to new indole compounds and more particularly to 9-pyrid-[3,4,-b]-indole compounds which contain in 1-position a β-hydroxy ethyl group, the α-carbon atom of which carries two hydrogen atoms, their salts and quaternary compounds.

A β-hydroxy-ethyl group in these compounds is preferably one which is further substituted at the β-carbon atom. Suitable substituents are, especially, aliphatic, alicyclic or araliphatic radicals, such as alkyl, e. g. methyl, ethyl, propyl, butyl and the like; alkylene such as butylene, pentylene, hexylene; cycloalkyl, e. g. cyclopentyl, cyclohexyl, cycloheptyl; or aralkyl, e. g. benzyl and alkoxybenzyl.

The new compounds may carry further substituents, for example, in the aromatic ring of the indole nucleus, e. g. free or substituted hydroxy groups, alkyl groups or halogen atoms, and especially in 7-position free or etherified hydroxyl groups, e. g. lower alkoxy such as methoxy. They may also contain organic substituents in 9-position, e. g. alkyl or aralkyl radicals.

The new compounds have valuable pharmaceutical properties; thus they exhibit a tranquilizing effect and can be used as medicaments, for example, as tranquilizers for the treatment of states of agitation such as anxiety, tension, nervousness, stress and irritability. They can also be used for the manufacture of medicaments as intermediates.

Especially valuable are 9-pyrid-[3,4-b]-indole compounds wherein the β-hydroxy-ethyl group has the formula

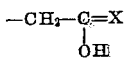

and primarily such of the formula

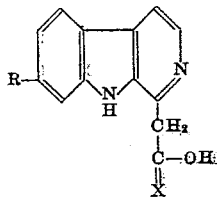

in which formulae R stands for a lower alkoxy group, especially methoxy, and X is a divalent alkylene residue such as butylene-(1,4), pentylene-(1,5), hexylene-(1,6), and preferably 1-methyl-pentylene-(1,5). The alkylene residue in these compounds may also contain substituents such as free, esterified or etherified hydroxyl groups. Especially valuable is the 1-{β-hydroxy-β,β-[1'-methylpentylene-(1',5')]-ethyl}-7-methoxy-9-pyrid-[3,4-b]-indole of the formula

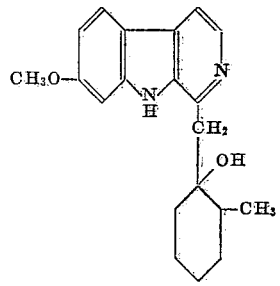

The new compounds are obtained according to a preferred process by reacting a 1-methyl-9-pyrid-[3,4-b]-indole with an aldehyde or ketone, the only reacting group of which is the carbonyl group, so as to produce a 1-β-hydroxy-ethyl compound. In this process the 1-methyl-9-pyrid-[3,4-b]-indole is advantageously used in the form of an organic metal compound, preferably the lithium compound. The reaction is carried out with advantage in an inert solvent.

Another procedure for the preparation of the new compounds consists in converting in a 1-(β-X-ethyl)-9-pyrid-[3,4-b]-indole wherein X represents a substituent convertible into the hydroxyl group X into such group. Thus an esterified hydroxy group present in β-position may be hydrolyzed or a halogen atom converted into the hydroxyl group.

Furthermore, the new compounds can be made starting from a mono-unsaturated derivative of a 1-ethyl-9-pyrid-[3,4-b]-indole in which the additional double bond extends from the β-carbon atom of the radical in 1-position by adding the elements of water to that double bond so as to produce a 1-β-hydroxy-ethyl compound.

From the obtained tertiary amines, quaternary ammonium compounds can be made by reaction with quaternizing agents such as reactive esters of lower alkanols, e. g. of strong inorganic or organic acids, preferably hydrohalic acids, alkanesulfonic acids, or alkylsulfuric acids, such as methyl iodide, dimethylsulfate or methane sulfonic acid methyl ester.

Depending on the working conditions, the new compounds are obtained in the form of the free bases or the salts. From the bases nontoxic or therapeutically useful salts can be obtained, such as, for example, those of hydrochloric acid, sulfuric acid, nitric acid, perchloric acid, phosphoric acid, acetic acid, propionic acid, lactic acid, oxalic acid, succinic acid, malic acid, tartaric acid, citric acid, ascorbic acid, methane sulfonic acid, ethane sulfonic acid, hydroxyethane sulfonic acid, benzoic acid, salicyclic acid, p-aminosalicylic acid or toluene sulfonic acid, by reacting the bases with such acids. On the other hand, salts obtained can be converted into other therapeutically useful or nontoxic salts or into the free bases by customary methods.

The novel compounds can be made up into preparations suitable for enteral or parenteral administration, e. g. in the form of tablets, ampoules and other dosage unit forms. For this purpose any suitable pharmaceutical carrier or vehicle may be employed, e. g. water, gelatin, lactose, starch, magnesium stearate, talc, vegetable oils, benzyl alcohol, gums, polyalkylene glycols, petroleum jelly, cholesterol or other known carrier substances for medicaments.

The following examples will serve to illustrate the invention. In the examples the relationship of parts by weight to parts by volume is that of the gram to the milliliter.

*Example 1*

A suspension of 4 parts by weight of finely ground 1-methyl-7-methoxy-9-pyrid-[3,4-b]-indole in 200 parts by volume of anhydrous ether is vigorously stirred in an atmosphere of dry nitrogen with 25 parts by volume of an approximately 1.5 normal ethereal solution of phenyl lithium for one hour. A second portion of 1.5 normal ethereal phenyl lithium is added and stirring continued for another hour. A solution of 7.4 parts by weight of cyclohexanone in 25 parts by volume of anhydrous ether is added over 30 minutes with stirring. Stirring is continued for 18 hours. 20 parts by weight of ice are then added with stirring and the solution filtered from any small amount of unreacted starting material. The ether is agitated with 50 parts by volume of 5 per cent aqueous hydrochloric acid, causing a partial separation of the crude, gummy hydrochloride of the desired cyclohexanol derivative. This, combined with the aqueous acid phase, is vigorously agitated with an excess ammonia causing a crystallization of the base. It is then recrystallized from ethanol yielding pure 1-[β-hydroxy-β,β-pentylene-(1′,5′)-ethyl]-7-methoxy-9-pyrid-[3,4-b]-indole of the formula

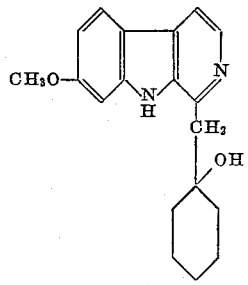

which melts at 172–173°. The hydrochloride of this base is prepared by adding one equivalent of 8N ethanolic hydrogen chloride to a concentrated ethanolic solution of the base. It may be recrystallized from water and melts at 267–268°.

*Example 2*

Substituting 8.4 parts by weight of 2-methylcyclohexanone for cyclohexanone in Example 1, there is obtained 1-{β-hydroxy-β,β-[1′-methyl-pentylene-(1′,5′)]-ethyl}-7-methoxy-9-pyrid-[3,4-b]-indole of the formula

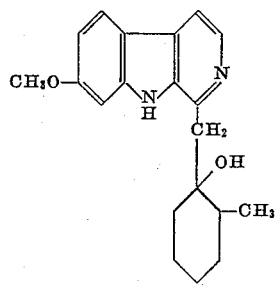

It melts at 169–170° with a sintering and resolidification at 120–130° caused by the loss of solvent of crystallization.

*Example 3*

Substituting 9.5 parts by weight of 2,6-dimethylcyclohexanone for the cyclohexanone in Example 1, there is obtained 1-{β-hydroxy-β,β-[1′,5′-dimethyl-pentylene-(1′,5′)]-ethyl}-7-methoxy-9-pyrid-[3,4-b]-indole of the formula

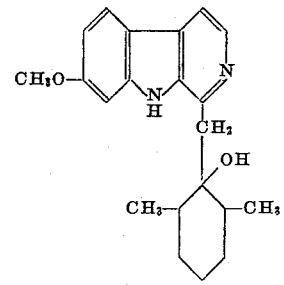

which melts at 200–202°.

*Example 4*

Substituting 6.4 parts by weight of cyclopentanone for the cyclohexanone in Example 1, there is obtained 1-[β-hydroxy-β,β-butylene-(1′,4′)-ethyl]-7-methoxy-9-pyrid-[3,4-b]-indole of the formula

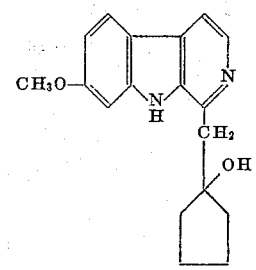

melting at 200–202°.

*Example 5*

Substituting 6.2 parts by weight of butyraldehyde for the cyclohexanone in Example 1, there is obtained 1-(β-hydroxy-β-n-propyl-ethyl)-7-methoxy-9-pyrid-[3,4-b]-indole of the formula

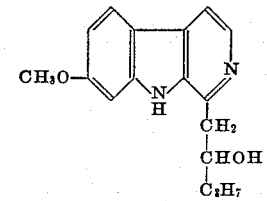

melting at 89–91°. Its hydrochloride prepared according to the method described in Example 1 melts at 228–229°.

*Example 6*

Substituting 6.2 parts by weight of ethylmethylketone for the cyclohexanone in Example 1, there is obtained 1-(β-hydroxy-β-methyl-β-ethyl-ethyl)-7-methoxy-9-pyrid-[3,4-b]-indole of the formula

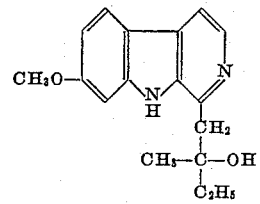

which melts at 95–98°. The hydrochloride prepared as described in Example 1 melts at 200–202°. From the free base, the methiodide of the formula

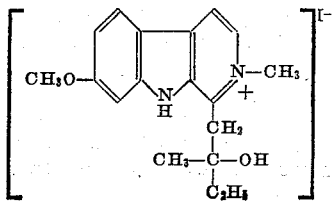

can be obtained in the following manner: 5 parts by weight of 1-(β-hydroxy-β-methyl-β-ethyl - ethyl) - 7-methoxy-9-pyrid-[3,4-b]-indole are refluxed for 3 hours in 100 parts by volume of ethanol and 10 parts by volume of methyl iodide. The small amount of insoluble material separating during the refluxing is filtered off and the filtrate concentrated to a small volume. Addition of ethyl acetate causes the precipitation of the gummy quaternary salt which crystallizes on stirring. The thus obtained 1-(β-hydroxy-β-methyl-β-ethyl - ethyl)-7-methoxy-9-pyrid-[3,4-b]-indole methiodide after filtering and recrystallization melts at 200° (dec.).

Example 7

2 parts by weight of 1-methyl-7-methoxy-9-benzyl-pyrid-[3,4-b]-indole and 20 parts by volume of a 1 N ethereal solution of lithium phenyl are stirred in suspension in 100 parts by volume of anhydrous ether for one hour, forming the lithium derivative of the starting material. An ether solution (20 parts by volume) of 2.3 parts by weight of 2-methylcyclohexanone is added with stirring over one half hour. Stirring is continued for 18 hours. Ice-water is added with stirring to decompose the lithium derivatives. The ether is washed with water and then agitated with 50 parts by volume of 5 per cent aqueous hydrochloric acid which causes the separation of the insoluble salt of the desired 1-methyl-7-methoxy-9-pyrid-[3,4-b]-indole derivative. This is filtered and decomposed with an excess of ammonia in the presence of 100 parts by volume of ethyl acetate. The ethyl acetate solution is dried over anhydrous sodium sulfate and evaporated to dryness. The residue is recrystallized from ethanol yielding 1-{β-hydroxy-β,β-[1'-methyl - pentylene-(1',5')]}-7-methoxy-9-benzyl-pyrid-[3,4-b]-indole, of the formula

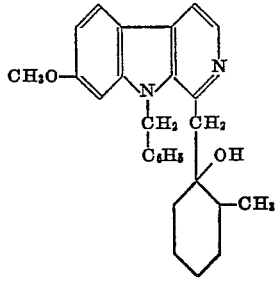

which melts at 160–162°. The starting material can be prepared as follows: 0.8 part by weight of potassium and 0.05 part by weight of ferric nitrate is stirred with 35 parts by volume of anhydrous liquid ammonia. After the blue color has been discharged indicating complete conversion of the potassium to potassium amide, 3.3 parts by weight of 1-methyl-7-methoxy-9-pyrid-[3,4-b]-indole are added with stirring. Immediate solution with the formation of the ind-N potassium derivative of 1-methyl-7-methoxy-9-pyrid-[3,4-b]-indole takes place. A solution of 2.4 parts by volume of benzyl bromide in 10 parts by volume of dry ether is then added with stirring. After one half hour, the ammonia is allowed to evaporate, ice-water is added and the solid precipitate collected by filtration. It is dissolved in the minimum of hot ethanol and filtered to remove the catalytic amount of iron oxide, water is added to the hot ethanol solution till turbidity and on cooling purified 1-methyl-7-methoxy-9-benzyl - pyrid - [3,4-b]-indole separates, melting at 138–139°.

What is claimed is:

1. A member selected from the group consisting of compounds of the formula:

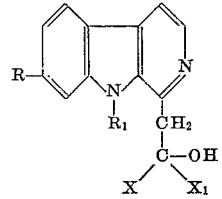

wherein R stands for a member selected from the group consisting of hydrogen and methoxyl, $R_1$ represents a member selected from the group consisting of hydrogen, lower alkyl and aralkyl and X and $X_1$ are members selected from the group consisting of hydrogen and lower alkyl at least one being lower alkyl, and when both X and $X_1$ are joined a divalent alkylene radical containing 4 to 7 carbon atoms; and the therapeutically useful acid addition salts and the lower alkyl quaternary compounds thereof.

2. 1-[1'-hydroxy-2'-methyl - cyclohexyl-(1')] - methyl-7-methoxy-9-pyrid-[3,4-b]-indole.

3. Therapeutically useful acid addition salts of the compound claimed in claim 2.

References Cited in the file of this patent

Groves et al.: J. Chem. Soc., vol. 1952, pp. 650–52.